(12) United States Patent
Lacey

(10) Patent No.: US 6,184,667 B1
(45) Date of Patent: Feb. 6, 2001

(54) DC/DC CONVERTER

(76) Inventor: James Christopher Lacey, 7 Bancroft Close, Tallaght, Dublin 24 (IE)

(*) Notice: Under 35 U.S.C. 154(b), the term of this patent shall be extended for 0 days.

(21) Appl. No.: 09/508,359

(22) PCT Filed: Sep. 9, 1998

(86) PCT No.: PCT/IE98/00074

§ 371 Date: Mar. 9, 2000

§ 102(e) Date: Mar. 9, 2000

(87) PCT Pub. No.: WO99/13559

PCT Pub. Date: Mar. 18, 1998

(30) Foreign Application Priority Data

Sep. 9, 1997 (IE) .................................................... S970668

(51) Int. Cl.$^7$ .................................................... G05F 1/40
(52) U.S. Cl. .................................................... 323/282; 323/286
(58) Field of Search .................................... 323/282, 284, 323/285, 288, 272, 350, 351, 352; 363/79, 80

(56) References Cited

U.S. PATENT DOCUMENTS

| | | | |
|---|---|---|---|
| 4,909,748 | * | 3/1990 | Forro et al. .................... 363/79 X |
| 4,929,882 | * | 5/1990 | Szepesi .......................... 323/285 X |
| 5,057,765 | * | 10/1991 | Clark et al. ...................... 323/288 |

* cited by examiner

Primary Examiner—Jessica Han
(74) Attorney, Agent, or Firm—Hoffman & Baron, LLP

(57) ABSTRACT

A DC/DC converter for use in a wide variety of electronic applications to convert higher level unregulated DC signals to lower lever regulated DC signals. The converter overcomes traditional converter problems such as inefficiencies, high cost and signal noise using a switching regulator circuit. The switching regulator circuit has a switching means (6) for switching the unregulated DC signal received, a current sense amplifier (4) for modulating the switching means, a hysteresis generator (10) for modulating the current sense amplifier and an output circuit for controlling delivery of a regulated DC signal to a converter output. The switching means is formed to deliver a substantially constant signal to the current sense amplifier using modulation.

11 Claims, 7 Drawing Sheets

BLOCK DIAGRAM

DC/DC CONVERTER

The present invention relates to a means of converting direct current (DC) voltages and to a DC/DC converter for generating non-isolated low voltage, regulated power from a relatively higher voltage source.

The requirement for conversion of DC voltages from a higher voltage to a lower fixed voltage is common in electronic systems. The higher voltage input may be fixed or variable and a DC/DC converter is used to provide a regulated lower voltage output under a variety of load conditions.

Previously known DC/DC converters have employed two main techniques for this conversion. Linear regulation, in which a linear regulator drops the required voltage differential between the input and output across a series element, and switch regulation, where a switching regulator varies the duty cycle of a series switch. A filter circuit to give a regulated output voltage averages the voltage produced by the switching regulator.

The main disadvantage of linear regulation is that the efficiencies are low. For example in a telephone application the source voltage is typically 48V and the corresponding regulated output is 5V. The efficiency here will be just over 10%.

Switch regulation converters are more efficient however, the circuit is generally more complex. Costs are higher and the switching regulator frequently produces unacceptable levels of signal noise. A further problem arises in that conventional switching regulators also present a negative impedance to the source which may cause "latch-up" under certain conditions.

It is an object of the present invention to overcome the above-mentioned disadvantages and to provide an improved DC/DC converter.

Prior art converters such as those shown in U.S. Pat. No. 4,791,350 (Square D), EP 0 496 529 and U.S. Pat. No. 4,929,882 all provide converters which are useful for certain applications. These converters do not however present a positive impedance to the source. The absence of this positive impedence can in many situation cause unacceptable latching of the converter. Additionally the proposed converters are complex and use an excessive number of components significantly improving costs.

Accordingly there is provided a DC/DC converter for converting an unregulated DC signal to a regulated DC signal, the converter including a switching regulator circuit of the type having:
  a switching means for switching an unregulated DC signal received at a converter input;
  a current sense amplifier for modulating the switching means;
  a hysteresis generator for modulating the current sense amplifier; and
  an output circuit for controlling delivery of a regulated DC signal to a converter output,
characterised in that the switching means is formed to
  deliver a substantially constant signal to the current sense amplifier,
  present a positive impedance to the source to prevent latching and the hysteresis generator is formed to provide positive switching of the switching circuit using a current limit transistor.

Preferably the hysteresis generator operates to control a current limit value in response to a variation in the unregulated DC signal.

In a preferred arrangement the output circuit includes an output filter and a shunt regulator.

According to one aspect of the invention there is provided a DC/DC converter for use in a telecommunication system the converter including a switching regulator circuit having:
  a switching means formed for connection to a telephone line power feed voltage source;
  a switching means formed for connection to a telephone line power feed voltage source;
  a current sense amplifier for modulating the switching means;
  a hysteresis circuit for modulating the current amplifier; and
  an output circuit for controlling regulated voltage supply for telecommunications logic circuitry,
  wherein the switching means includes a filter for attenuating switching noise induced on the telephone line.

Preferably the switching regulator circuit incorporates means for presenting a high impedance to the source for reducing line interference.

Preferably the converter is formed for connection to a telecommunications switch.

According to a further aspect of the invention there is provided a DC/DC converter for use with a controller the converter including a switching regulator circuit having:
  a switching means for connecting the controller to an unregulated DC voltage source;
  a current sense amplifier for modulating the switching means;
  a hysteresis generator for modulating the current amplifier; and
  an output circuit for controlling a regulated voltage supply for the controller the switching circuit being formed to provide a low voltage output and a high voltage output from an unregulated rectified mains voltage.

In a preferred embodiment of the invention the hysteresis generator includes hysteresis resistors, an output choke providing a switching current source.

According to another aspect of the invention there is provided an improved DC/DC converter having a switching regulator circuit, for converting an unregulated DC voltage to a regulated DC voltage, comprising:
  a switching means for switching the unregulated DC voltage;
  a current sense amplifier for modulating the switching means;
  a hysteresis generator for modulating the current sense amplifier; and
  an output circuit for controlling the regulated DC voltage, in which current passing through the current sense amplifier is kept substantially constant by the modulation of the switching means.

The hysteresis generator is operable to ensure switching occurs and that such switching is positive. The hysteresis generator is further operable to vary a current limit value corresponding to variations in the unregulated voltage. This arrangement provides a positive impedance (resistance) to the unregulated voltage source.

Current passing through the current sense amplifier is fed to the output circuit which comprises an output filter and a shunt regulator. Excess current from the filter is diverted into the shunt regulator to keep the regulated output voltage (substantially) constant.

The present invention further provides a DC/DC converter having a switching regulator circuit for use in a telecommunications or similar device, the circuit comprising:

a switching means for connecting to a telephone line power feed voltage source;

a current sense amplifier for modulating the switching means;

a hysteresis circuit for modulating the current amplifier; and an output circuit for controlling regulated voltage supply for telecommunications logic circuitry, in which filter components are connected to the switching means to attenuate switching noise induced on the telephone line and to present a high positive impedance (resistance) to the source to attenuate or eliminate interference on the line.

The above arrangement provides a circuit, which induces less heating in the telecommunications device, such as a peripheral device.

The above arrangement further provides a circuit of enhanced efficiency which draws significantly less power from the telecommunications device thereby decreasing the required power rating of the associated power supply unit.

In such an arrangement, where the telecommunications device is connected to a Private Automatic Branch Exchange (PABX), the power drawn from the PABX power supply unit by the regulator circuit of the present invention may be as little as 25% of power drawn by prior art circuits. Consequently, capital and running costs of the telecommunications device are reduced.

The present invention also provides a DC/DC converter having a switching regulator circuit for use with controller device such as a motor drive controller, the circuit comprising:

a switching means for connecting the controller to an unregulated DC voltage source;

a current sense amplifier for modulating the switching means;

a hysteresis generator for modulating the current amplifier; and an output circuit for controlling a regulated voltage supply for the controller device.

The circuit provides a first low voltage output and a second high voltage output from an unregulated, rectified mains voltage.

The low voltage output is suitable for providing power to logic circuitry in the controller device and the high voltage output is suitable for other stages typically connected to a controller device.

The regulator circuits described in detail hereinafter are operable to convert a relatively higher fixed voltage source to a lower fixed voltage, for example from 15 Vdc to 5 Vdc, or with minor modifications from a relatively higher variable voltage source to a lower fixed voltage.

The regulator circuits offer higher efficiency than linear regulators and are comparable in cost. The regulator circuits are adapted to be fed from a high source impedance without latching. The invention is applicable in a large number of applications and in particular for providing logic circuit supply voltages from a telephone line feed voltage or from a DC motor supply.

In the circuits of the invention, the provision of hysteresis resistors together with an output choke and freewheeling diode, alter the characteristics of the circuit from a linear current source to a switching current source. Additionally, when the input voltage is low, for example, in a 15V to 5V converter circuit the hysteresis resistors reduce the dependency of the current limit on the base to emitter voltage ($V_{be}$) of the current limit transistor.

Each circuit has the advantage of being inexpensive and obviates the requirement for a control circuit (usually realised with a control IC). The component count is low and where high input voltages are encountered only one high voltage transistor is required. The circuits further provide positive switching of the power element. During switching, the current to the base of the current limit transistor increases when the switching element is turning off and decreases when the switching element is turning on. Relatively fast switching speeds are achieved allowing high frequency operation and facilitating the use of a physically smaller output choke.

Advantageously, as the input voltage increases, the current limit increases yielding a positive input impedance which is desirable in many applications where a source is current limited or has a large resistance, for example, in telecommunications line circuits.

The invention will now be described more particularly with reference to the accompanying drawings which show, by way of example only, six embodiments of the DC/DC converter regulating circuit according to the invention.

Figure 1:
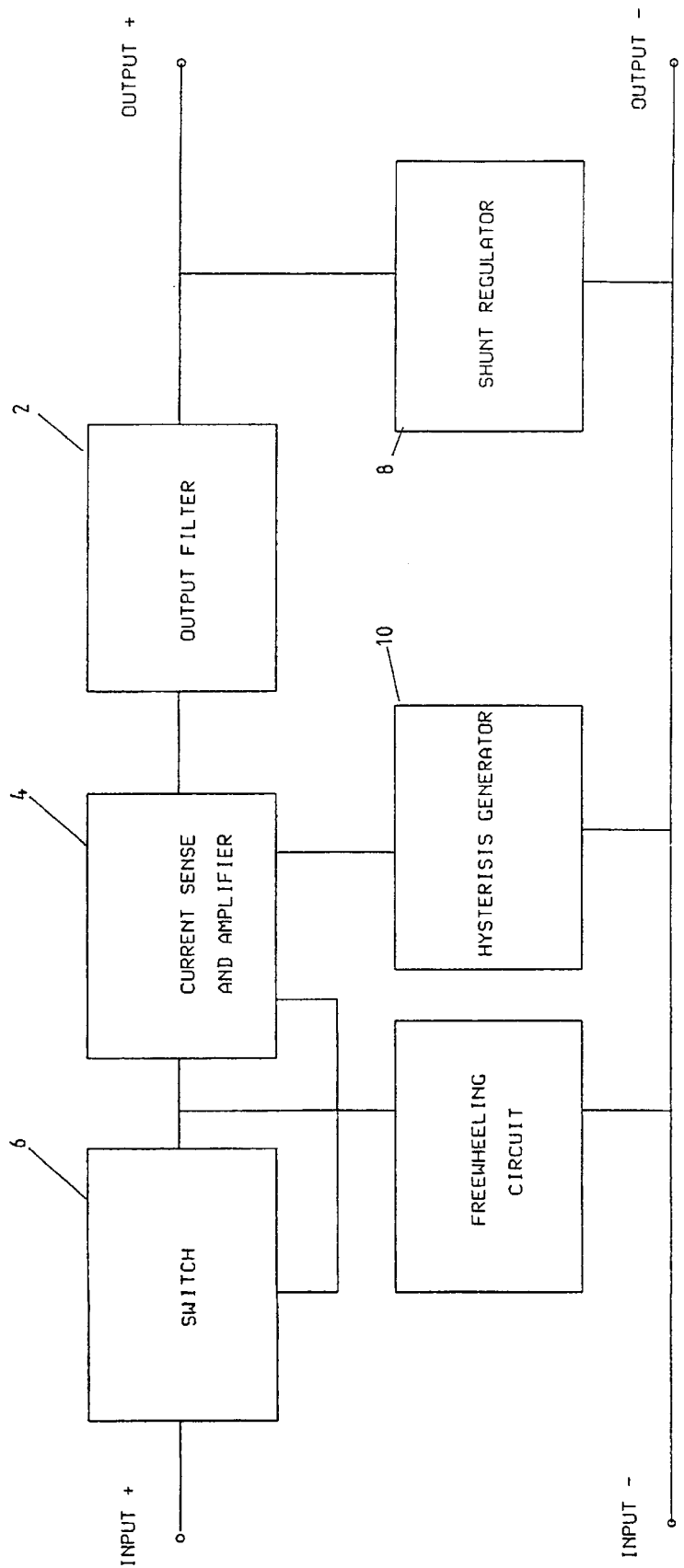
FIG. 1 is a schematic block diagram of basic DC/DC converter including a switching voltage regulator.

Referring to the drawings and initially to FIG. 1, the unregulated input voltage INPUT +, INPUT − is impressed on the output filter 2 via a current sense section 4 and a switch 6. A current sense amplifier 4 modulates the switch "on" time to keep the current constant in a current sense resistor (not shown). This current supplies the output OUTPUT +, OUTPUT −. Excess current is diverted into a shunt regulator 8 keeping the output voltage OUTPUT +, OUTPUT − constant.

A hysteresis generator 10 performs three functions, namely:

it ensures that the circuit switches;

it ensures that the switching action is positive; and it increases the current limit value with increasing input voltage ensuring a positive input resistance.

Figure 2:
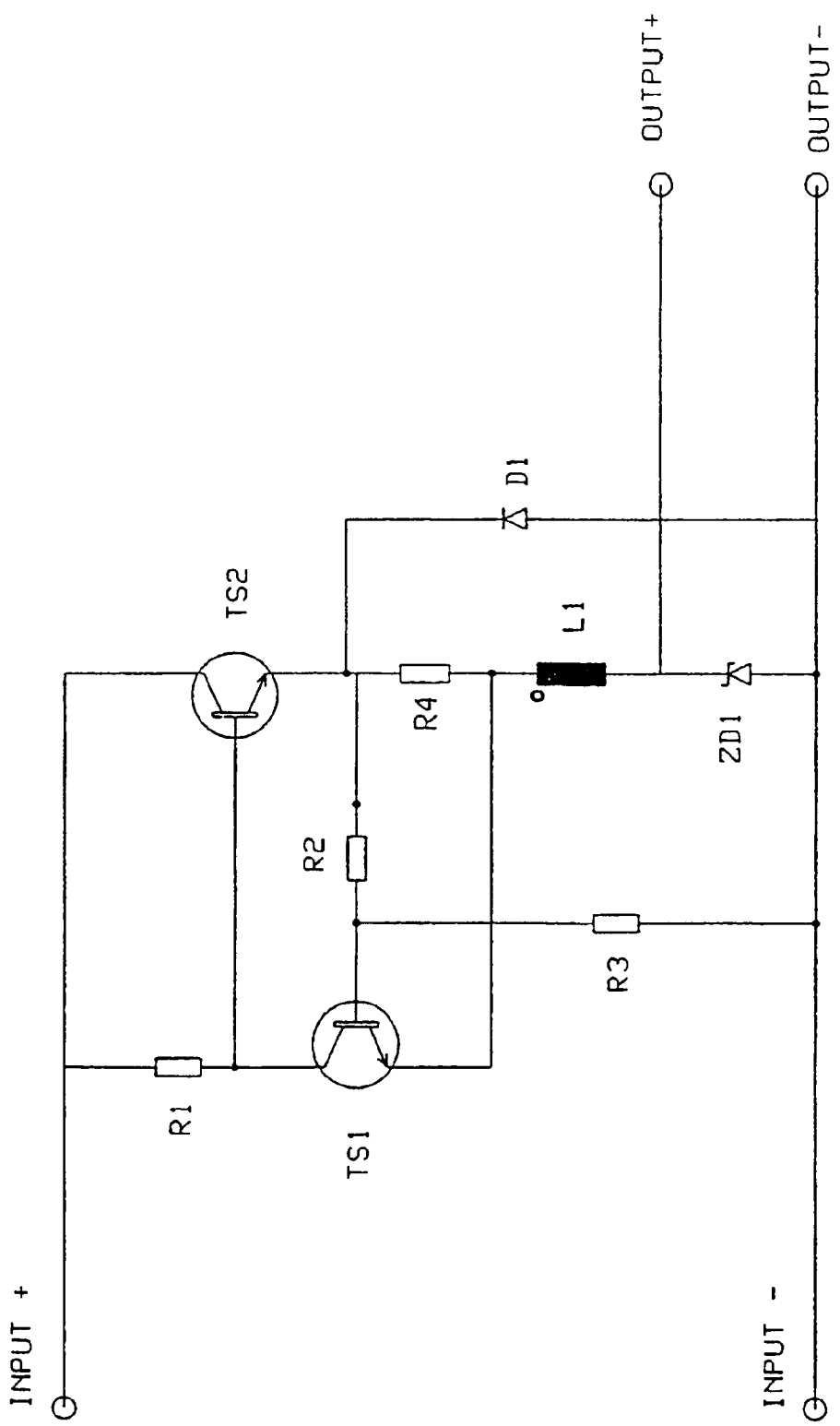
FIG. 2 is a schematic circuit diagram of the first embodiment of the converter.

FIG. 2 shows a simple implementation of the invention in schematic form. When the input voltage INPUT +, INPUT − is applied, a switching transistor TS2 is turned "on" via a bias resistor R1. A potential divider formed by a resistor pair R3,R2 provides a current to a hysteresis generator to produce a negative bias on the base of a current limit transistor TS1 with respect to its emitter. Current builds up linearly in a filter coil L1. This current also flows through a current sense resistor R4. When the current in the current sense resistor R4 exceeds a value set by the sum of the base-emitter voltage of the current limit transistor TS1 and the negative bias voltage generated by the potential divider R2,R3, the transistor TS1 is turned "on" diverting bias current from the base of the switching transistor TS2, turning it "off". The emitter voltage of the switching transistor TS2 then goes negative, through the flyback action of the filter coil L1, until this voltage is clamped by a freewheel diode D1. The current then decreases in the coil L1 and the current sense resistor R4. The negative bias which existed on the base of current limit transistor TS1 reduces as the emitter of the switching transistor TS2 goes negative thus turning the current limit transistor TS1 "on" harder and ensuring positive switching of the switching transistor TS2. The current limit transistor TS1 remains "on" and thus TS2 remains "off" until the voltage across the current sense resistor R4 falls to a value equal to the base-emitter voltage of the current limit transistor TS1. When the voltage falls, the current limit transistor TS1 turns "off" and allows the switching transistor TS2 to turn "on" again.

As the emitter voltage of the switching transistor TS2 rises, the negative bias voltage, due to the voltage across the potential divider R2,R3, on the base of the current limit transistor TS1, increases ensuring positive switching. An output shunt connected zener diode ZD1 forms a shunt regulator diverting excess current from the filter coil L1, keeping the output voltage at the required level. A shunt connected capacitor C1 (not shown) reduces ripple on the output voltage and supplies load transient currents.

Figure 3:
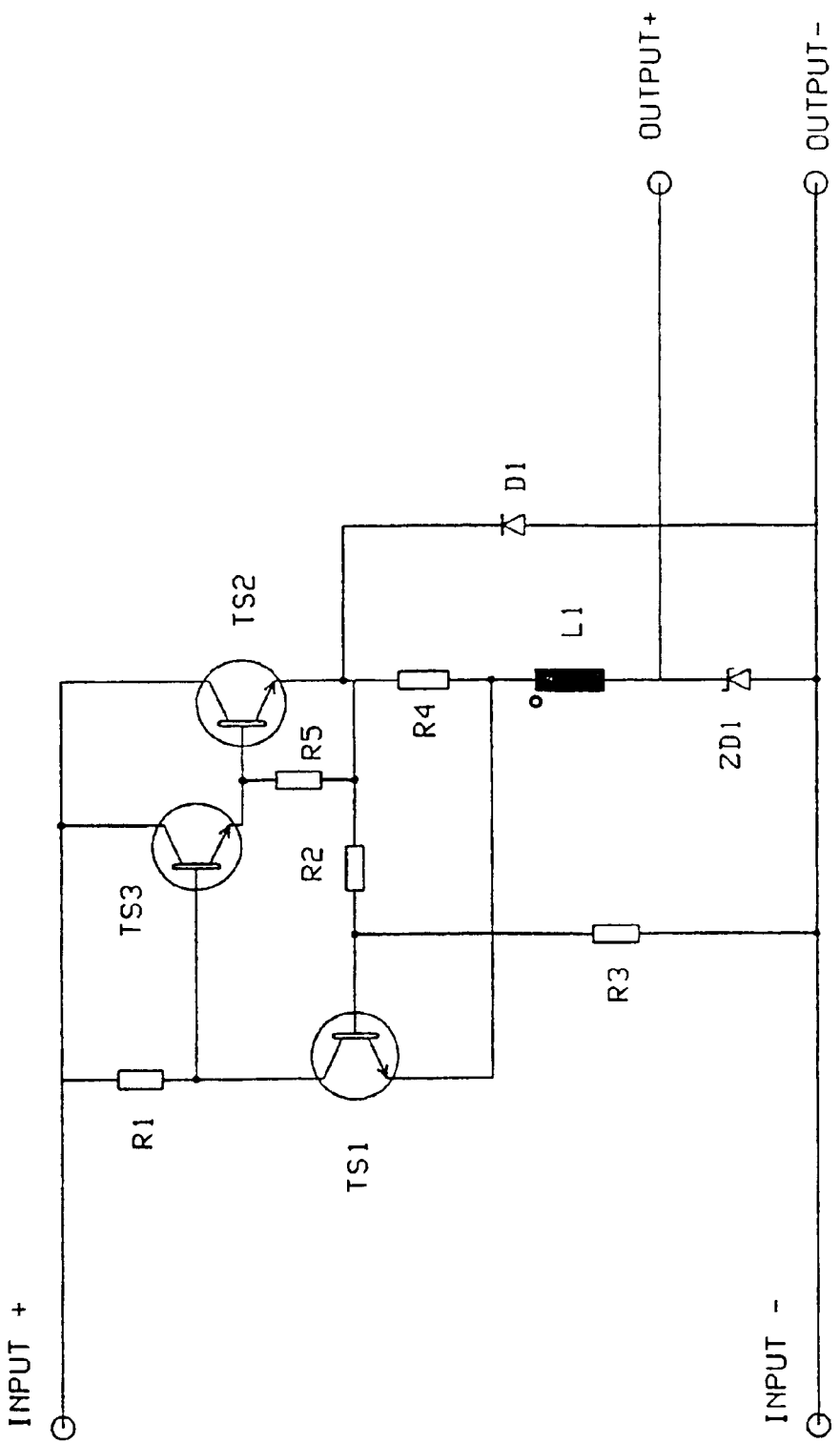
FIG. 3 is a schematic circuit diagram of a second embodiment of converter including a circuit modification to improve efficiency.

FIG. 3 is a second embodiment circuit similar to FIG. 2, in which a transistor TS3 and biasing resistor R5 have been introduced into the switching circuit. The introduced transistor TS3 is connected to the base of the switching transistor TS2 in a Darlington configuration. Since the gain of the Darlington connected transistors TS2,TS3 is higher than that of a single transistor, the biasing resistor R1 for the switching transistor TS1 may be of a higher value, reducing the dissipation in the resistor R1 and increasing the efficiency of the circuit. The further biasing resistor R5 connected between the base and emitter of the switching transistor TS2 improves its turn off time. The Darlington connected transistors TS2,TS3 and the biasing resistor R5 may be replaced with a commercially available Darlington pair.

Figure 4:
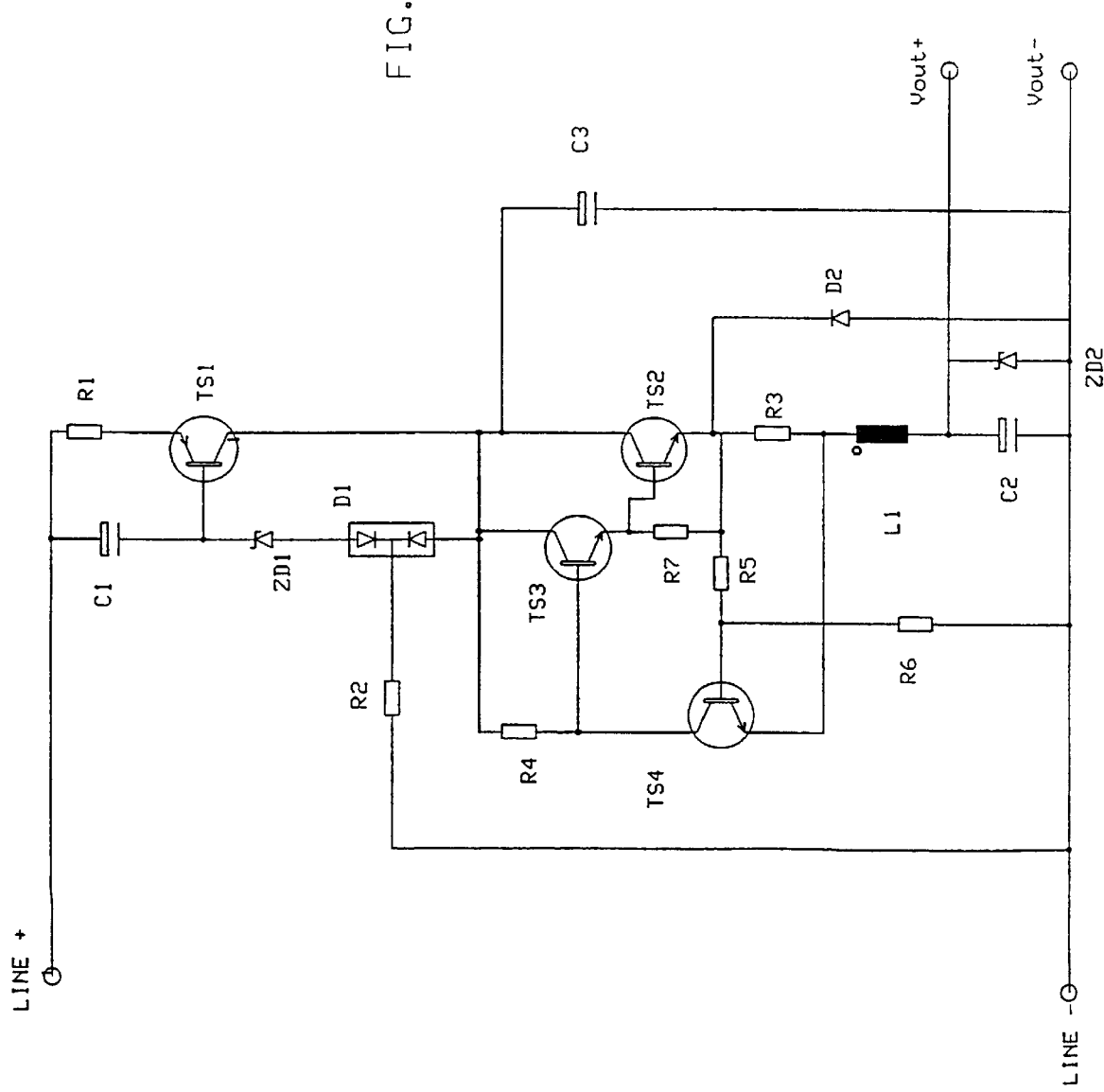
FIG. 4 is a schematic circuit diagram of a third embodiment adapted for use with a telephone line power feed for various telecommunications devices.

FIG. 4 shows the third embodiment of the circuit adapted for use with a telephone, a telecommunications peripheral device or as a power converter in association with a Private Automatic Branch Exchange (PABX). A telephone power feed voltage is normally an unregulated 40V to 60V dc. This voltage has to be converted down to a logic circuit supply voltage. The circuit used is similar to that of FIG. 3 but includes additional components forming a filter R1,R2,C1, D1,ZD1,TS1 to prevent induction of power supply switching noise onto a telephone line and also to present a high ac impedance to the line circuit to prevent interference with communications to the peripheral device.

This circuit has increased efficiency and provides the advantages over it's linear equivalent, namely:
less heating in the peripheral device; and
reduction of power drawn from the PABX power supply by up to 75%, As the power feed comprises a substantial proportion of a PABX power consumption, significant savings in power supply size and power consumption are achieved at minimal cost. The reduction in power required may bring the power requirements of small PABX systems below 75W and thereby achieving exemption from mains harmonic directives with a further saving in power supply cost.

Figure 5:
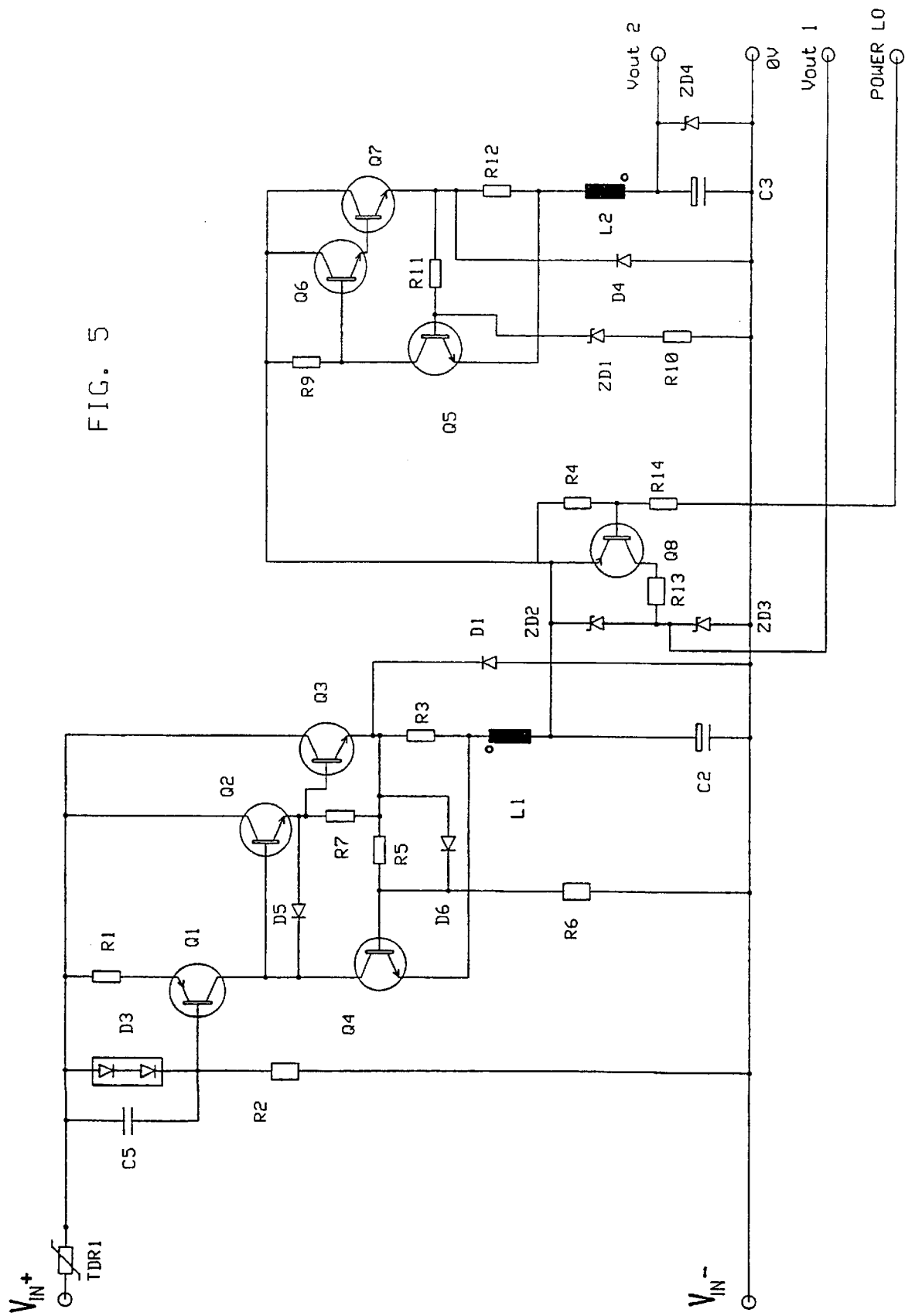
FIG. 5 is a schematic circuit diagram of a fourth embodiment of circuit providing a two output supply suitable for use with a controller such as a motor drive controller.

Referring now to FIG. 5, the fourth embodiment of circuit finds application in a motor drive controller and other similar applications. A first voltage regulated output Vout1 is a low current output [typically at 15V] to drive Field Effect Transistors (FETs) or Insulated Gate Bipolar Transistors (IGBTs). A second lower voltage regulated output Vout2 is used to drive logic and control circuitry or a dedicated micro-controller and it's associated circuitry at typically 5V. The input voltage would normally be derived from a rectified mains voltage which is used elsewhere in the motor drive controller. This voltage is often 300 Vdc but may vary from 170 Vdc to 370 Vdc.

In the circuit, a cascade arrangement is used. A first converter Q3 and associated circuitry, generates a 15V output Vout1 across a shunt connected zener diode ZD3 and an intermediate voltage which is used to supply a second converter Q7 and associated circuitry, which generates the logic voltage output, Vout2.

The intermediate voltage is equal to the sum of the voltages of zener diodes ZD2, ZD3 at start-up but after a predetermined time a "POWER LO" signal is received from external logic circuitry, a signal transistor Q8 turns "on" though a potential divider circuit R14,R4 and the intermediate voltage is reduced to the voltage across the shunt connected zener diode ZD3 plus a small residual voltage across the signal transistor Q8 and its associated collector connected resistor R13.

The reason for this action is that, at start-up, the logic circuitry current requirement is more than twice that of the steady state current requirement. The output current of the second converter Q7 increases with input voltage. The regulator circuit is tailored using a potential divider circuit R10,ZD1,R11 on a current limit transistor Q5 to give out the required higher current when the intermediate voltage ($V_{ZD2}+V_{ZD3}$) output is high. The advantage of this approach is that the current in the filter coil L1 is less than 50% of the required value if the intermediate voltage is always equal to the second output voltage Vout2. This allows a four times reduction in size of the output filter coil L1. When the intermediate voltage is switched, the current drawn from the input reduces to increase the efficiency of the converter in the steady state condition.

Comparing the first stage of the circuit shown in FIG. 5 with the embodiment of FIG. 2, the following changes are noted.
a. Darlington coupled transistors Q2,Q3 are driven by a constant current source circuit R2,C5,D3,R1,Q1. This arrangement improves efficiency of the circuit shown in FIG. 5 over a high input voltage range.
b. To improve the relatively slower switching speeds of the higher voltage transistors, a diode D5 is provided to remove current from the base of the first converter Q3 to increase its turn-off speed.
c. A diode D6 is added in the potential divider circuit biasing a current limit transistor Q4. The regulator circuit is designed provide out full power at 170V input. The added diode D6 prevents a current increase occurring above this voltage so that above 170V approximately the circuit looks like a constant current source.

Figure 6:
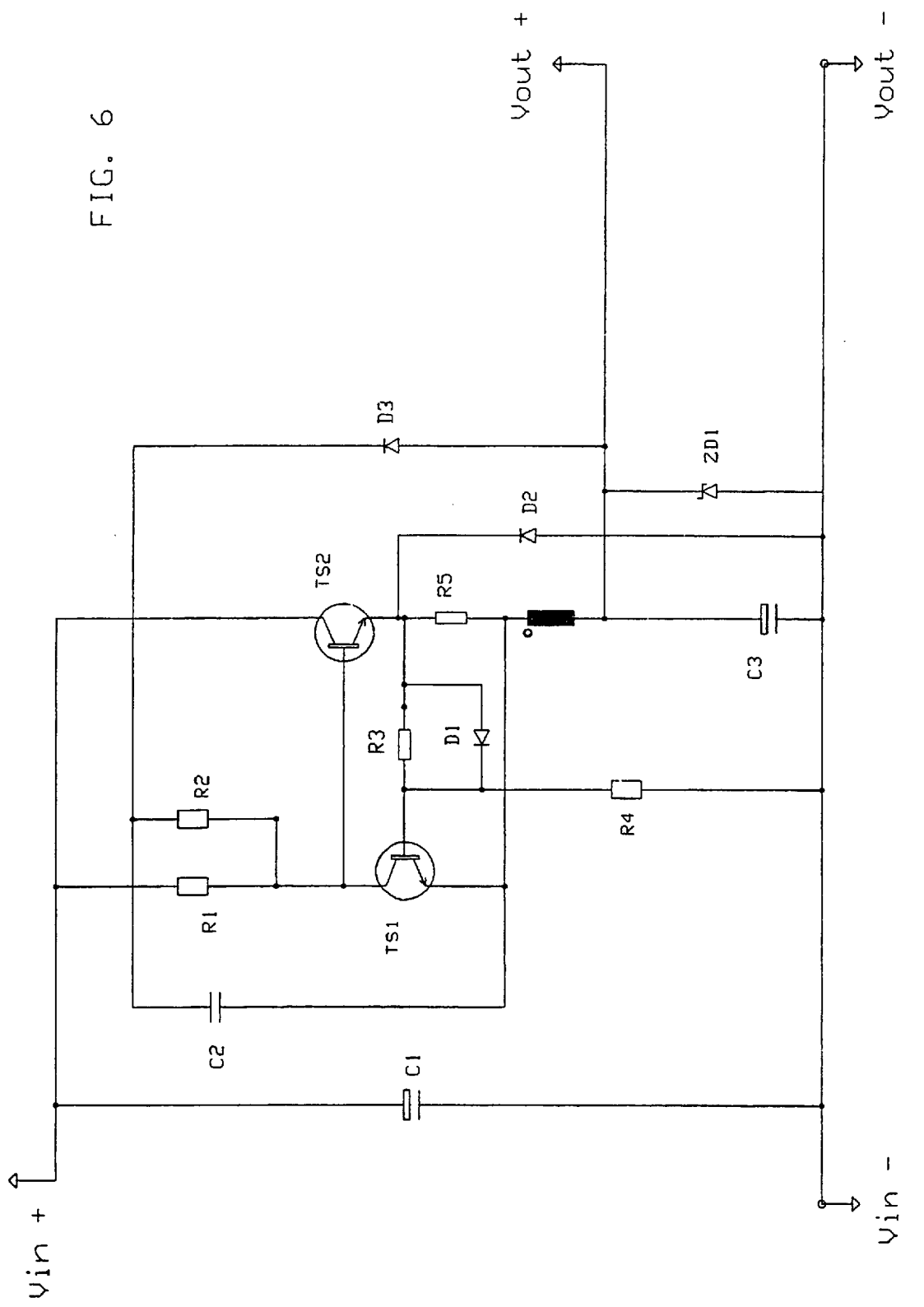
FIG. 6 is a schematic circuit diagram of a fifth embodiment of circuit providing a single output supply with "bootstrapping" and FIG. 7 is a schematic diagram of a sixth embodiment similar to that shown in FIG. 6, having a negative supply output.

With reference to FIG. 6, the fifth embodiment of circuit provides an adaptation of power supply for use with a high voltage input. This circuit is similar to the first stage of the circuit shown in FIG. 5. However, the constant current source circuit R2,C5,D3,R1,Q1 and the current buffer transistor Q2 together with the associated diode D5 and resistor R7 have been removed and replaced by a bootstrap circuit comprising a diode D3, a capacitor C2 and a resistor R2.

The circuit is started by the collector connected resistor R1 of the current limit transistor TS1. When the output voltage rises the bootstrap capacitor C2 is charged up to the output voltage via the diode D3 and resistor R2, providing bias current for switching transistor TS2. Since the bias current is coming from a lower voltage it can be increased and removes the necessity of using a Darlington connected transistor pair. The circuit is thus less costly to implement as it eliminates the necessity for two high voltage transistors.

Figure 7:
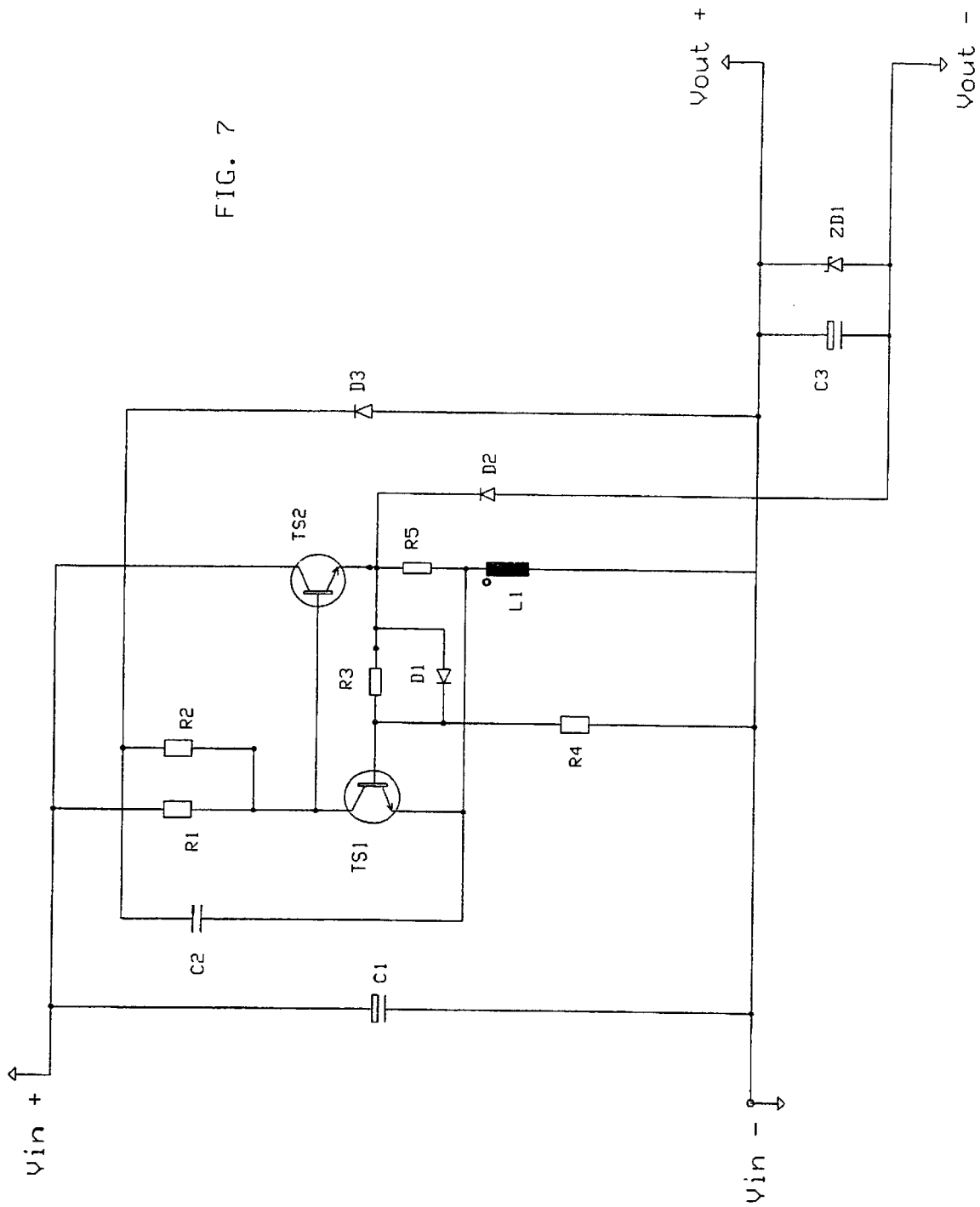

Finally, with reference to FIG. 7, the sixth embodiment provides a circuit similar to that shown in FIG. 6 which is adapted to provide a negative output. It should be noted that the component count remains unchanged.

It will be seen that each of the circuits described above may be adapted to use a field effect transistor (FET) as the main switching transistor, for example, to replace transistor TS2 in FIGS. 6 and 7.

It will of course be understood that the invention is not limited to the specific details described herein, which are given by way of example only, and that various modifications and alterations are possible within the scope of the invention.

What is claimed is:

1. A DC/DC converter for converting an unregulated DC signal to a regulated DC signal, the converter including a switching regulator circuit of the type having:
    a switching means for switching an unregulated DC signal received at a converter input;
    a current sense amplifier for modulating the switching means;
    a hysteresis generator for modulating the current sense amplifier; and
    an output circuit for controlling delivery of a regulated DC signal to a converter output,
characterised in that the switching means is formed to deliver a substantially constant signal to the current sense amplifier, present a positive impedance to the source to prevent latching and the hysteresis generator is formed to provide positive switching of the switching circuit using a current limit transistor.

2. A DC/DC converter as claimed in claim 1 wherein the hysteresis generator operates to control a current limit value in response to a variation in the unregulated DC signal.

3. A DC/DC converter as claimed in claim 2 wherein the output circuit includes an output filter and shunt regulator.

4. A DC/DC converter as claimed in claim 1 wherein the output circuit includes an output filter and shunt regulator.

5. A DC/DC converter as claimed in claim 1 wherein the hysteresis generator includes hysteresis resistors, and an output choke providing a switching current source.

6. A DC/DC converter as claimed in claim 1 for use in a telecommunication system in which the switching regulator circuit has:
    the switching means formed for connection to a telephone line power feed voltage source;
    the current sense amplifier formed for modulating the switching means;
    the hysteresis circuit formed for modulating the current amplifier; and
    the output circuit formed for controlling regulated voltage supply for telecommunications logic circuitry,
wherein the switching means includes a filter for attenuating switching noise induced on the telephone line.

7. A DC/DC converter as claimed in claim 6 wherein the switching regulator circuit incorporates means for presenting a high impedance to the source for reducing line interference.

8. A DC/DC converter as claimed in claim 7 in which the converter is formed for connection to a telecommunications switch.

9. A DC/DC converter as claimed in claim 6 in which the converter is formed for connection to a telecommunications switch.

10. A DC/DC converter for use with a controller the converter including a switching regulator circuit of the type having:
    a switching means for connecting the controller to an unregulated DC voltage source;
    a current sense amplifier for modulating the switching means;
    a hysteresis generator for modulating the current amplifier; and
    an output circuit for controlling a regulated voltage supply for the controller characterised in that the switching circuit is formed to provide a low voltage output and a high voltage output from an unregulated rectified mains voltage and the hysteresis generator is formed to provide positive switching of the switching circuit using a current limit transistor.

11. A DC/DC converter as claimed in claim 10 wherein the hysteresis generator includes hysteresis resistors, and an output choke providing a switching current source.

* * * * *